US007644428B2

(12) United States Patent
    Akiyama

(10) Patent No.: US 7,644,428 B2
(45) Date of Patent: Jan. 5, 2010

(54) RECEIVING APPARATUS HAVING INTEGRATED PROGRAM GUIDE THAT INTEGRATES PROGRAM INFORMATION RECEIVED FROM PLURAL TRANSMISSION MEDIA

(75) Inventor: Hitoshi Akiyama, London (GB)

(73) Assignee: Hitachi, Ltd., Tokyo (JP)

( * ) Notice: Subject to any disclaimer, the term of this patent is extended or adjusted under 35 U.S.C. 154(b) by 161 days.

(21) Appl. No.: 11/670,077

(22) Filed: Feb. 1, 2007

(65) Prior Publication Data

US 2007/0288960 A1    Dec. 13, 2007

(30) Foreign Application Priority Data

Jun. 7, 2006   (JP) .............................. 2006-158484

(51) Int. Cl.
    *G06F 3/00*    (2006.01)
    *G06F 13/00*   (2006.01)
    *H04N 5/445*   (2006.01)

(52) U.S. Cl. .............................. 725/49; 725/48; 725/40; 725/51

(58) Field of Classification Search ................... 725/40, 725/48, 49, 51
See application file for complete search history.

(56) References Cited

U.S. PATENT DOCUMENTS 5,550,576 A * 8/1996 Klosterman .................. 725/46

6,401,242 B1 * 6/2002 Eyer et al. .................... 725/35
7,310,330 B2 * 12/2007 Chae et al. ................... 370/352

FOREIGN PATENT DOCUMENTS

| JP | 2001-008119 | 1/2001 |
| JP | 2001-008124 | 1/2001 |
| WO | WO00/52928 | 9/2000 |
| WO | WO 0052928 A1 * | 9/2000 |

* cited by examiner

*Primary Examiner*—Christopher Kelley
*Assistant Examiner*—Timothy R Newlin
(74) *Attorney, Agent, or Firm*—Antonelli, Terry, Stout & Kraus, LLP.

(57) ABSTRACT

The present invention provides an easy-to-search program guide having efficient display contents of program information when receiving digital broadcasting from plural transmission media. A program information extracting unit extracts program information for channels receivable from a first and a second transmission media, and stores the extracted program information of individual channels in a storing unit. A program information integrating unit, when integrating program information of the first transmission media and program information of the second transmission media, compares program information stored in the storing unit, and integrates duplicate program information of a same channel, if any, into one piece of program information. A display contents creating unit creates a program guide based on the integrated program information, and displays it in a display unit.

3 Claims, 7 Drawing Sheets

| PROGRAM TABLE | BROADCASTING: TERRESTRIAL DIGITAL | | | | |
|---|---|---|---|---|---|
| 61 | CHANNEL 001 | CHANNEL 003 | CHANNEL 004 | CHANNEL 006 | CHANNEL 008 |
| AM 10 | WEATHER FORECAST | PROGRAM GUIDE | DOCUMENTARY | MOVIE | NEWS |
|  | ANIMATION | DRAMA |  |  |  |
| AM 11 | SHOPPING |  |  |  | SPORTS |
|  |  |  | VARIETY | WEATHER FORECAST |  |
| AM 12 | SPORTS | NEWS |  | DRAMA | WEATHER FORECAST |
|  | 601 | 602 | 603 | 604 | 605 |

| PROGRAM TABLE | BROADCASTING: TERRESTRIAL DIGITAL | | | |
|---|---|---|---|---|
| | CHANNEL 001 | CHANNEL 003 | CHANNEL 004 | CHANNEL 008 |
| AM 10 | WEATHER FORECAST | PROGRAM GUIDE | DOCUMENTARY | NEWS |
| AM 11 | ANIMATION | DRAMA | | |
| | SHOPPING | | | SPORTS |
| AM 12 | SPORTS | NEWS | VARIETY | WEATHER FORECAST |
| | 301 | 302 | 303 | 304 |

FIG. 4

PROGRAM TABLE  BROADCASTING: IP RETRANSMISSION — 40

| | CHANNEL 001 | CHANNEL 004 | CHANNEL 006 | CHANNEL 010 |
|---|---|---|---|---|
| AM 10 | WEATHER FORECAST | DOCUMENTARY | MOVIE | ANIMATION |
| | ANIMATION | | | |
| AM 11 | SHOPPING | | | COMEDY |
| | | VARIETY | WEATHER FORECAST | |
| AM 12 | SPORTS | | DRAMA | SPECIAL PROGRAM |

PROGRAM TABLE   BROADCASTING: TERRESTRIAL DIGITAL

| | CHANNEL 001 | CHANNEL 001 | CHANNEL 003 | CHANNEL 004 | CHANNEL 004 |
|---|---|---|---|---|---|
| AM 10 | WEATHER FORECAST | WEATHER FORECAST | PROGRAM GUIDE | DOCUMENTARY | DOCUMENTARY |
| | ANIMATION | ANIMATION | DRAMA | | |
| AM 11 | SHOPPING | SHOPPING | | | |
| AM 12 | SPORTS | SPORTS | NEWS | VARIETY | VARIETY |

| PROGRAM TABLE | BROADCASTING: TERRESTRIAL DIGITAL | | | | |
|---|---|---|---|---|---|
| 61 | CHANNEL 001 | CHANNEL 003 | CHANNEL 004 | CHANNEL 006 | CHANNEL 008 |
| AM 10 | WEATHER FORECAST | PROGRAM GUIDE | DOCUMENTARY | MOVIE | NEWS |
|  | ANIMATION | DRAMA | | | |
| AM 11 | SHOPPING | NEWS | | | SPORTS |
|  | | | VARIETY | WEATHER FORECAST | |
| AM 12 | SPORTS | | | DRAMA | WEATHER FORECAST |
|  | 601 | 602 | 603 | 604 | 605 |

RECEIVING APPARATUS HAVING INTEGRATED PROGRAM GUIDE THAT INTEGRATES PROGRAM INFORMATION RECEIVED FROM PLURAL TRANSMISSION MEDIA

CLAIM OF PRIORITY

The present application claims priority from Japanese application serial no. JP 2006-158484 filed on Jun. 7, 2006, the content of which is hereby incorporated by referenced into this application.

BACKGROUND OF THE INVENTION (1) Field of Invention

The present invention relates to a receiving apparatus that receives digital broadcasting from plural transmission media and creates a program guide.

(2) Description of the Related Art

In television, voice, and data broadcasting, the transition from conventional analog systems to digital systems is promoted worldwide, and the transition from analog broadcasting to digital broadcasting is scheduled in each country. In digital broadcasting, streams satisfying encoding and multiplexing standards such as MPEG (Motion Picture Expert Group) are transmitted. One of advantage of the digital broadcasting is easy acquisition of an electronic program guide (EPG) in a receiving apparatus. An EPG, which is added data concerning programs contained in transmitted streams, is extracted and displayed to increase a user's program selection operability.

With widespread use of digital broadcasting employing plural transmission media such as satellite broadcasting and terrestrial broadcasting, it is desirable that broadcasting services transmitted over plural transmission media can be received in one receiving apparatus. A conceivable method of displaying an EPG in a receiving apparatus capable of receiving plural transmission media is to display an EPG for each of transmission media. With this method, however, when a user wants to display EPGs of other transmission media, since the user displays the EPGs while switching the transmission media, the operability of program searching is poor.

Technology for solving this problem is disclosed in Japanese Patent Laid-Open No. 2001-8124 (patent document 1). According to the technology, when switching is made between receiving networks, a program list created in a receiving network after the switching is added for display to a program list having been created in a receiving network before the switching. The following technology is disclosed in Japanese Patent Laid-Open No. 2001-8119 (patent document 2). When program information in plural information providing systems is selectively integrated and displayed, the number of pieces of program information to be integrated is decided based on predetermined integration conditions for each of the information providing systems.

SUMMARY OF THE INVENTION

Recently, as new transmission media, a broadband network based on IP (Internet Protocol) technology has become widespread. The broadband network has a transmission band capable of transmitting streams of digital broadcasting. A stream transmission system based on the MPEG-over-IP system is being developed that uses the broadband network to put MPEG streams on an IP packet. Furthermore, in Japan, to expand a receivable area of terrestrial digital broadcasting, a study is being made of the so-called IP retransmission of terrestrial digital broadcasting that transmits streams of terrestrial digital broadcasting by the MPEG-over-IP system.

There are two methods for acquiring streams transmitted by the IP retransmission from IP broadcasting service providers that perform the IP retransmission. One method is to receive and demodulate RF (Radio Frequency) transmission waves transmitted from a terrestrial digital broadcasting transmitting station of a relevant region to acquire streams. Another method is to receive streams directly from terrestrial digital broadcasting transmitting stations and transmit them over a broadband network. By either of the methods, channels of the IP retransmission are exactly the same as those at direct reception of RF transmission waves of terrestrial digital broadcasting of a relevant region.

With widespread use of terrestrial digital broadcasting, it is conceivable that a receiving apparatus capable of both the reception of IP retransmission by broadband network connection and the direct reception of RF transmission waves from terrestrial digital broadcasting transmitting stations will appear. Even if both the reception of IP retransmission and the direct reception of RF transmission waves from terrestrial digital broadcasting transmitting stations are possible in such a receiving apparatus, when there is no difference between received channels of the IP retransmission and the RF direct reception as described above, it is enough for the user to receive only one of them. Also with regard to an EPG, it is enough for it to be displayed using only information received by the IP retransmission or the RF direct reception.

However, RF transmission waves of terrestrial digital broadcasting may be received not only in a relevant region but also regions adjacent to it. As a result, there may occur a difference between streams transmitted over a broadband network with the IP retransmission, and streams receivable by the RF direct reception from transmitting stations of the adjacent regions. In this case, the user can view different channels and programs by switching between the IP retransmission and the RF direct reception for reception. However, not all channels receivable by the IP retransmission and the RF direct reception are the same, and some channels may be exactly the same.

EPG display in such a situation is assumed. In the case of a receiving apparatus that displays an EPG for each of transmission media, since the IP retransmission and the RF direct reception use different transmission media for reception, EPGs of the two systems of the IP retransmission and the RF direct reception are separately created and displayed. However, although channels in the systems are channels broadcast as terrestrial digital broadcasting which are originally transmission media common to both the systems, the channels are not displayed in a single EPG, so that a user's search operability is poor.

By using the technology disclosed in the above-described patent document 1, a single EPG can be displayed for the IP retransmission and the RF direct reception. However, with the above-described patent document 1, since program lists of plural transmission media are simply added, when same channels exist between the IP retransmission and the RF direct reception, these are duplicately displayed in an EPG. With the technology disclosed in the above-described patent document 2, when channels are received in plural information providing systems, although the user can decide the number of pieces of program information to be displayed of each information providing system, when same channels exist in the plural information providing systems, the channels are duplicately displayed on an EPG.

Such duplicate display of same channels are meaningless to the user, and the useless display might worsen operability during program searching.

An object of the present invention is to provide a receiving apparatus that solves the above-described problems and provides an easy-to-search screen having efficient display contents of program information when receiving digital broadcasting from plural transmission media.

The receiving apparatus of the present invention, which can receive digital broadcasting from a first and a second transmission media, includes a program information extracting unit that extracts program information for channels receivable from the first and the second transmission media, a storing unit that stores program information of individual channels extracted in the program information extracting unit, a program information integrating unit that integrates program information of the first transmission media and program information of the second transmission media, and a display contents creating unit that creates a program guide to be displayed in a display unit, based on program information integrated in the program information integrating unit. The program information integrating unit compares the program information stored in the storing unit, and integrates duplicate program information of a same channel, if any, into one piece of program information.

One of the first and the second transmission media receives digital broadcasting via an Internet protocol.

The program information extracting unit includes respective dedicated program information extracting units for the first and the second transmission media, and concurrently extracts program information from the first and the second transmission media.

The program information integrating unit compares network IDs, TS-IDs, or service IDs included in individual pieces of program information stored in the storing unit, and determines that program information having at least one same ID of these IDs is program information of a same channel.

The display contents creating unit displays a program guide in the display unit without making a distinction between the first and the second transmission media from which program information was received.

According to the present invention, when digital broadcasting is received from plural transmission media, an easy-to-search screen having efficient display contents of program information can be provided, so that the user's operability is increased.

BRIEF DESCRIPTION OF THE DRAWINGS

Embodiments of the present invention will be described in detail based on the following figures, wherein:

FIG. 3 is a drawing showing an example of displaying an EPG for terrestrial digital broadcasting;

FIG. 4 is a drawing showing a display example of displaying an EPG for IP retransmission broadcasting;

FIG. 5 is a drawing (comparative example) showing a display example with EPGs of two systems integrated;

FIG. 6 is a drawing showing a display example with EPGs of two systems integrated of this embodiment.

DETAILED DESCRIPTION OF THE PREFERRED EMBODIMENT

Hereinafter, preferred embodiments of the present invention will be described in detail with reference to the accompanying drawings.

First Embodiment

Figure 1:
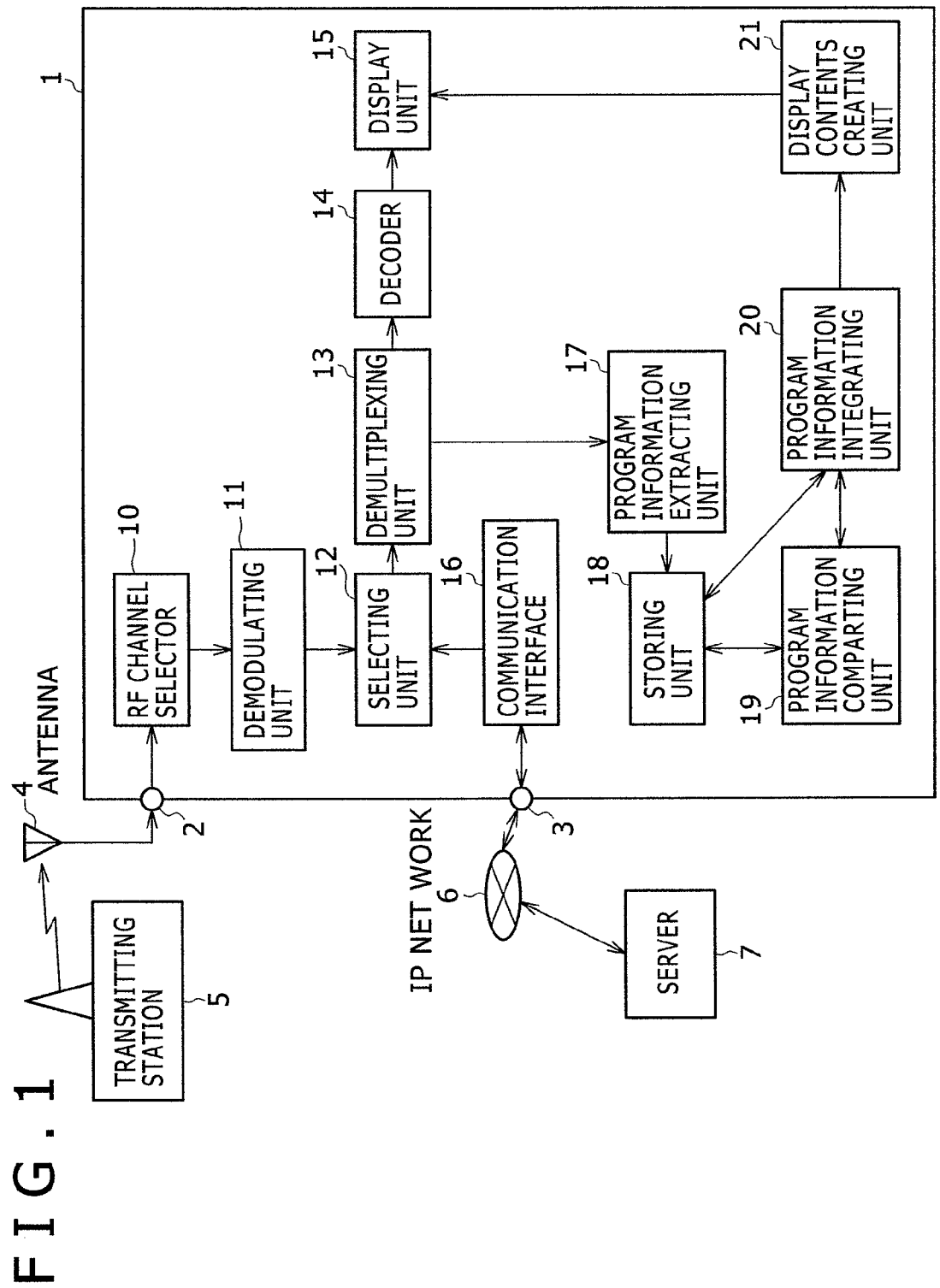
FIG. 1 is a block diagram showing one embodiment of a receiving apparatus of the present invention.

FIG. 1 is a block diagram showing one embodiment of a receiving apparatus of the present invention. In FIG. 1, a receiving apparatus 1, which can receive digital broadcasting from two transmission media, includes two input terminals, which are: an RF input terminal 2 to input RF signals; and a terminal 3 to connect IP communication.

First, a description will be made of a construction to directly receive RF signals of terrestrial digital broadcasting as transmission media. An RF signal of terrestrial digital broadcasting is transmitted from a transmitting station 5. The RF signal is a modulated signal that is modulated for terrestrial digital broadcasting in the transmitting station 5 and transmitted after conversion into a required frequency. This signal contains plural channels, each of which consists of streams into which encoded video and voice signals and added data containing program information are multiplexed. An antenna 4 for ground waves connected to the receiving apparatus 1 receives the RF signal, and the received RF signal is inputted to the receiving apparatus 1 from the RF input terminal 2.

The RF signal inputted to the RF input terminal 2 is inputted to an RF channel selector 10 (e.g., tuner), which performs frequency conversion for a desired channel, that is, a channel selecting operation, and outputs a desired modulated signal to a demodulating unit 11 (e.g., demodulator). The demodulating unit 11 demodulates the modulated signal with the channel selected, and outputs multiplexed streams to a selecting unit 12. Since the demodulating unit 11 cannot demodulate the modulated signal to output a stream if it has no sufficient reception level, receivable channels depend on the installation conditions of the receiving apparatus 1 (radio reception status).

The selecting unit 12 selects from among the streams outputted from the demodulating unit 11 and outputs a selected stream to a demultiplexing 13 (e.g., demultiplexer). The demodulating unit 13 separates encoded video and voice signals and added data containing program information by type, and outputs the encoded video and voice signals to a video/voice decoder 14, and the added data to a program information extracting unit 17. The video/voice decoder 14 decodes the encoded video and voice signals and outputs them to a display unit 15 (e.g., display and loudspeaker) to reproduce video and voice in the display unit 15. On the other hand, the program information extracting unit 17 extracts program information from the added data and stores it in a storing unit 18 (e.g., semiconductor memory).

Next, a description will be made of a construction for receiving IP retransmission over an IP network as transmission media. A signal from the IP network 6 is connected to the communication terminal 3 of the receiving apparatus 1. A server 7 to transmit a multiplexed stream over IP is connected to the IP network 6. By issuing a stream transmission request from the communication interface 16 to the server 7 via the IP network 6, a multiplexed stream transmitted from the server 7 can be acquired.

When a channel transmitted from the server 7 is the same as a channel transmitted from a transmitting station of terrestrial digital broadcasting as a modulated signal, the case is referred to as IP retransmission of terrestrial digital broadcasting. By the way, even if the channels are the same, in the case of transmission over IP, to reduce a transmission band, an encoding method different from terrestrial digital broadcasting may be employed. However, viewable program contents are the same to the user, and this case can also be referred to as IP retransmission of terrestrial digital broadcasting.

The receiving apparatus 1 fetches multiplexed streams of a channel requested to transmit in the communication interface 16, and outputs them to the selecting unit 12. The selecting unit 12 selects from among the streams from the communication interface 16 and outputs a selected stream to the demultiplexing unit 13. A construction after that is the same as that at RF direct reception of terrestrial digital broadcasting. The demodulating unit 13 separates encoded video and voice signals and added data containing program information by type, and outputs them to the video/voice decoder 14, and the program information extracting unit 17, respectively. The video/voice decoder 14 decodes the encoded video and voice signals and reproduces video and voice in the display unit 15. The program information extracting unit 17 extracts program information from the added data and stores it in the storing unit 18.

In the receiving apparatus of this embodiment, furthermore, RF direct reception stored in the storing unit 18 and program information from IP retransmission are compared in a program information comparing unit 19 to check whether program information of a same channel exists. A program information integrating unit 20 adds and integrates program information of both RF direct reception and IP retransmission to create program information as single transmission media. Furthermore, when it is determined in the program information comparing unit 19 that a same channel exists, the program information integrating unit 20 deletes either piece of program information of the same channel.

If program information without overlapping of information of a same channel can be created as a result of comparing of all program information of RF direct and IP retransmission, the program information is stored in the storing unit 18 as new program information. Therefore, only one piece of program information of a same channel is stored in the storing unit 18. A display contents creating unit 21 creates display contents based on new program information stored in the storing unit 18, and displays EPG in the display unit 15. As a result, the display unit 15 can display EPG without overlapping of same channels. The selecting unit 12, the program information extracting unit 17, the program information comparing unit 19, the program information integrating unit 20, and the display contents creating unit 21 are normally constructed as software that operates within the CPU.

Hereinafter, the operation of individual units in the receiving apparatus of this embodiment will be described in detail.

First, a description will be made of the operation of the individual units in the case of displaying program information as EPG at the time of direct reception of an RF signal of terrestrial digital broadcasting. Program information is extracted by the program information extracting unit 17 from added data containing program information separated in the demultiplexing unit 13, and stored in the storing unit 18. When only direct reception of the RF signal is performed as a transmission media, the program information integrating unit 20 performs no processing and outputs the program information to the display creating unit 21. The display creating unit 21 creates EPG data based on the program information, and the display unit 15 displays the EPG data as an EPG viewable to the users. Data used for EPG display is table information referred to as PSI (Program Specific Information), SI (Service Information), and EIT (Event Information Table).

To acquire program information of all receivable channels, it is necessary that the RF channel selector 10 selects each channel and the program information extracting unit 17 extracts program information from streams of each channel. For example, in RF direct reception, it is assumed that four channels 001, 003, 004, and 008 are receivable. First, the channel 001 is selected in the RF channel selector 10, and program information is extracted in the program information extracting unit 17 via the demodulating unit 11, the selecting unit 12, and the demultiplexing unit 13, and stored in the storing unit 18. The same operation is performed for the channels 003, 004, and 008, and program information of all channels is stored in the storing unit 18. The program information comprises broadcasting start time and end time, a program title, and program content information, and the like.

FIG. 3 is a drawing showing an example of displaying an EPG on a television screen with respect to program information of channels receivable over terrestrial digital broadcasting. A reference number 30 denotes a header portion indicating a receiving transmission media, and in this example, shows that terrestrial digital broadcasting is directly received. Channels are displayed in a horizontal axis and time is displayed in a vertical axis. Time is displayed in a reference number 31 and program contents of each channel are displayed in each column of reference numbers 301 to 304. In this example, program information of four channels can be acquired, and channels 001, 003, 004, and 008 are assigned to columns 301, 302, 303, and 304, respectively, and broadcasting start time and end time, and a program title are displayed using the acquired program information. When receivable channels are too many to display them on the screen at a time, program information of all channels can be displayed by lateral scrolling.

The operation of the individual units in the case of displaying program information as EPG at the time of reception of IP retransmission over an IP network is also the same as that at the time of RF direct reception. Specifically, for added data containing program information separated in the demultiplexing unit 13, only program information is extracted by the program information extracting unit 17, and stored in the storing unit 18. For reception by use of only the IP network, the program information integrating unit 20 performs no processing, and outputs program information to the display contents creating unit 21. The display contents creating unit 21 creates EPG data based on the program information, and displays it as an EPG in the display unit 15.

To acquire program information of all receivable streams, it is necessary that a channel transmission request is issued to the server 7 via a network 112 in the communication interface 16, and program information is extracted from received streams of each channel in the program extracting unit 17. For example, in IP retransmission, it is assumed that streams of channels 001, 004, 006, and 010 are transmitted from the server 7. In this case, first, a transmission request of the channel 001 is issued to the server 7 from the communication interface 16, and streams of the channel 001 are fetched in the communication interface 16. Next, program information is extracted in the program information extracting unit 17 via the selecting unit 12 and the demultiplexing unit 13, and stored in the storing unit 18. The same operation is performed for the channels 004, 006, and 010, and program information of all channels is stored in the storing unit 18.

FIG. 4 is a drawing showing an example of displaying an EPG on a television screen with respect to program information of channels receivable over IP retransmission broadcasting. A reference number 40 denotes a header portion indicating a receiving transmission media, and in this example, shows that IP retransmission broadcasting is received. In this example, program information of four channels has been acquired, channels 001, 004, 006, and 010 are assigned to columns 401, 402, 403, and 404, respectively, and broadcasting start time and end time, and a program title are displayed using the acquired program information.

The above has described the operation of the receiving apparatus during the respective separate EPG displays for the direct reception of an RF signal and the reception of IP retransmission data. For any of the direct reception of an RF signal and IP retransmission, plural channels may be received. However, all of channels receivable during IP retransmission, and channels receivable during the direct reception of an RF signal may not always be the same. This is because in the case of the direct reception of an RF signal, receivable channels depend on installation conditions (radio wave receiving condition) of the receiving apparatus 1, while in the case of IP retransmission, the server 7 selects channels to be transmitted. Since the terrestrial digital broadcasting is constructed as a transmission media based on a regional license, the IP retransmission may also be provided with restrictions on operation such as limitation on receivable regions like the terrestrial digital broadcasting. As a result, receivable channels may differ between the direct reception of an RF signal and IP retransmission.

In the examples shown in FIGS. 3 and 4, the channels 001 and 004 can be received in both the RF direct reception and the IP retransmission, while the channels 003 and 008 can be received in only the RF direct reception, while the channels 006 and 010 can be received in only the IP retransmission. When viewable channels are different depending on transmission media such as the RF direct reception and the IP retransmission, user needs to use an EPG of all channels viewable from the both arise. To address the needs, if EPGs of different transmission media such as the RF direct reception and the IP retransmission RF can be integrated for display, usability to the users would increase.

FIG. 5, shown for comparison, is a drawing showing a display example with EPGs of two systems merely added and integrated. In this example, the columns 301 to 304 of FIG. 3, and the columns 401 to 404 of FIG. 4 are integrated for display in order of channel numbers. Specifically, the channel 001 during RF direct reception shown in the column 301 of FIG. 3 is displayed in column 501 of FIG. 5, and the channel 001 during IP retransmission shown in the column 401 of FIG. 4 is displayed in column 502 of FIG. 5. The channel 003 during RF direct reception shown in the column 302 of FIG. 3 is displayed in column 503 of FIG. 5. The channel 004 during RF direct reception shown in the column 303 of FIG. 3 is displayed in column 504 of FIG. 5. The channel 004 during IP retransmission shown in the column 402 of FIG. 4 is displayed in column 505 of FIG. 5. Although up to five columns (501 to 505) are laterally displayed on the display screen of FIG. 5, the following channels 006, 008, and 010 are also displayed in the same arrangement so that the users can view following screens by lateral scrolling.

As shown in FIG. 5, if channels of RF direct reception and IP retransmission are simply added, when same channels between the RF direct reception and the IP retransmission can be received, these would be duplicately displayed. In this example, the columns 501 and 502 duplicately display EPG with respect to the channel 001, and the columns 504 and 505 duplicately display EPG with respect to the channel 004. Even if transmission media are different between the RF direct reception and the IP retransmission, if channels and programs received are the same, duplicate display is meaningless and useless to the users.

In contrast to this, FIG. 6, which is a drawing showing a display example with EPGs of two systems in this embodiment, integrates same channels without duplication. When EPGs of FIGS. 3 and 4 are integrated, EPGs for the channels 001 and 004 overlap between the RF direct reception and the IP retransmission. In this case, program information of the channels 001 and 004 is stored in the storing unit 18 of FIG. 1, with one of the duplicate piece of program information deleted. Therefore, in FIG. 6, the channel 001 is displayed in only column 601, and the channel 004 is displayed in only column 603, so that same channels are not displayed duplicately. Since the difference between the two transmission media of the RF direct reception and the IP retransmission are transparent to the users, the difference of the transmission media does not need to be displayed in a header 60. Although in FIG. 6, the words "Terrestrial digital" are displayed in the header portion 60, actually, channels viewable only with IP retransmission are also displayed.

According to the display method of this embodiment, the users do not need to perform transmission media switching operation between RF direct reception and IP retransmission to search an EPG. Furthermore, since same channels are not duplicate, there is no useless display area, and the users can easily search for programs to be viewed. These provide high synopsis for EPG display and increase the users' usability.

The following describes how the program information comparing unit 19 checks whether two channels are the same in this embodiment.

Since ID information such as network ID, TS-ID, and service ID are assigned to streams transmitted over the terrestrial digital broadcasting, these can be used for the check. Specifically, in Japan's terrestrial digital broadcasting, a network ID is assigned to a regional broadcaster, and it is guaranteed that it is unique in Japan. A TS-ID is assigned to each of transport streams (TS) transmitted by the broadcasters and it is guaranteed that it is unique in Japan. A service ID is assigned to each of services contained in the transport stream and it is guaranteed that it is unique in Japan. Since the respective items of ID information are guaranteed unique as described above, when streams of the terrestrial digital broadcasting are IP-retransmitted without being modified, the check can be made using any of the above-described items of ID information. With regard to the above-described ID information, actual assignment is described in the ARIB (Association of Radio Industries and Businesses) terrestrial digital television broadcasting operation specification TR-B14.

However, in the case of IP retransmission, the specification of ID information assignment is not yet decided, and IP retransmission may be made by modifying any of the above-described items of ID information. Therefore, it is desirable to make the check on the assumption that any of the above-described three items of ID information is modified. Specifically, all of network ID, TS-ID, and service ID are compared, and by determining that two channels are the same if at least one of the items of ID information matches, more accurate check can be made.

Figure 7:
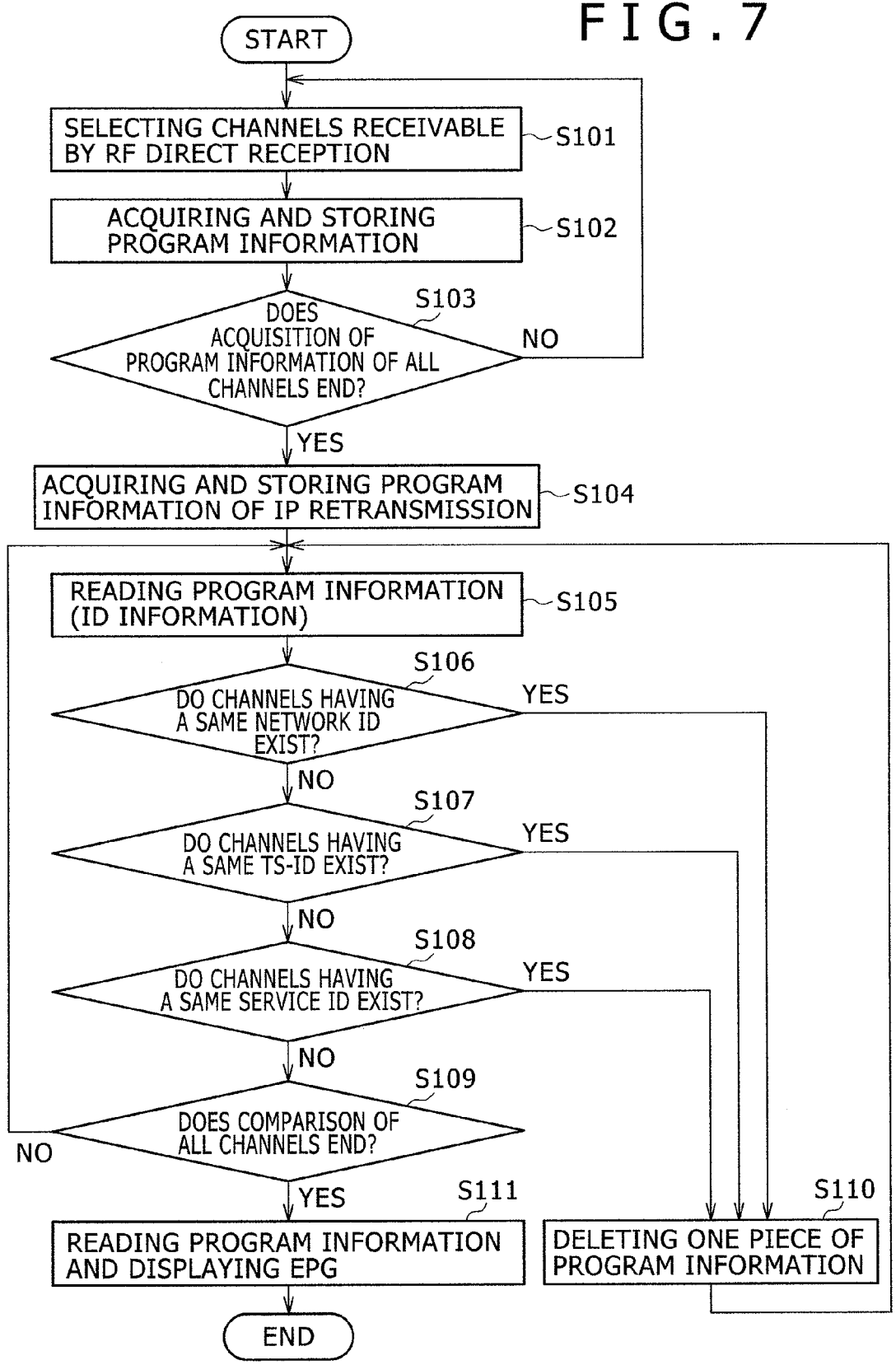
FIG. 7 is a flowchart showing processing from acquisition of program information to EPG display.

FIG. 7 is a flowchart showing the flow of processing from the acquisition of program information to EPG display in this embodiment. As a precondition, the users have terminated initial settings. That is, for RF direct reception of terrestrial digital broadcasting, it is assumed that receivable channels have been recognized by initial scanning. Also for IP retransmission, it is assumed that channels receivable from the server have been recognized. The following describes automatic acquisition of program information in standby state.

Naturally, during a user's usual program viewing, channel selection operation takes precedence over program information acquisition operation, which is temporarily halted.

Step S101 selects and demodulates channels receivable by RF direct reception one at a time, and Step S102 acquires program information and stores it in the storing unit 18. Step S103 checks whether program information of all channels having been recognized by the initial scanning has been acquired, and when channels not acquired exist, returns to Step S101 to again perform channel selection, and program information acquisition and storage. When program information of all receivable channels has been acquired, control proceeds to Step S104. Step S104 acquires program information of all channels receivable in the IP retransmission from the server 7, and stores it in the storing unit 18. Also here, Step 104 selects and demodulates the channels one at a time to acquire program information. In this way, in the storing unit 18, program information of the RF direct reception and program information of each channel of the IP retransmission reception are stored.

To integrally display the acquired program information, control proceeds to the check for same channels. Step S105 reads program information (ID information) of one channel (e.g., the channel 001 in FIG. 3) from among channels received by RF direct reception from the storing unit 18. Step S106 searches the storing unit 18 for a channel having a same network ID of channels received by the IP retransmission. If the same network ID exists, it can be determined that the channels are the same (e.g., the channel 001 in FIG. 4).

When they are the same, control proceeds to Step S110 to delete either piece of program information of the RF direct reception and the IP retransmission. When no same network ID exists, control proceeds to Step S107 to search the storing unit 18 for a channel having a same TS-ID of channels received by the IP retransmission. If the same TS-ID exists, since it can be determined that the channels are the same, control proceeds to Step S110 to delete either piece of program information. When no same TS-ID exists, control proceeds to Step S108 to search the storing unit 18 for a channel having a same service ID of channels received by the IP retransmission. If the same service ID exists, since it can be determined that the channels are the same, control proceeds to Step S110 to delete either piece of program information.

When a channel having the same ID does not exist until Step S108, program information of the storing unit 18 is not deleted. Step S109 checks whether comparison has been made for all channels received by the RF direct reception, and when channels not checked exist, returns to Step S105 to perform the same check based on program information on a next channel. When all channels have been thus checked, channels are stored in the storing unit 18 without duplication. Step S111 reads program information from the storing unit 18, and displays an EPG in the display unit 15 without duplicate channels.

According to such a channel checking method, even if any one of network ID, TS-ID, and service ID is modified during the IP retransmission, it is possible to made a check for same channels. The kind of ID information used for the check is not limited to these, and may be appropriately set depending on situations.

The above has described a method of checking for same channels by use of ID information. In addition to ID information, text information such as channel names, program names, and the like contained in streams may be used for the check. In this case, even if all ID information has been modified during IP retransmission, channel names and program names can be effectively used for the method of checking for same channels because they are identical.

Although in the above description, the receiving apparatus automatically determines which of RF direct reception and IP retransmission to display to display an EPG, the users may select priority. In this case, the users store program information of transmission media for which the users specify preferential display, in the storing unit 18. By doing so, the users can specify transmission media when searching for and viewing programs.

In the above description, when same channels exist between RF direct reception and IP retransmission, either piece of program information is deleted from the storing unit 18. However, both pieces of program information may be likewise stored in the storing unit 18, and only one of them may be displayed during display. In this case, in Step S110, one of two pieces of program information is added with display flag information (or non-display flag information indicating that it is not displayed) before being stored. The display flag (non-display flag) is used to determine whether display contents are displayed in the display contents creating unit 21. Step S111 displays only the program information with the display flag on (displayed).

As described above, when both the different transmission media of RF direct reception and IP retransmission are received, in this embodiment, the contents of received streams of the both are compared, and for same channels, the channels are integrated to display an EPG without duplication of the channels. By this method, without making the user conscious of the difference between two transmission media, and without duplication and loss of channels, an easy-to-use EPG screen can be provided.

Second Embodiment

Figure 2:
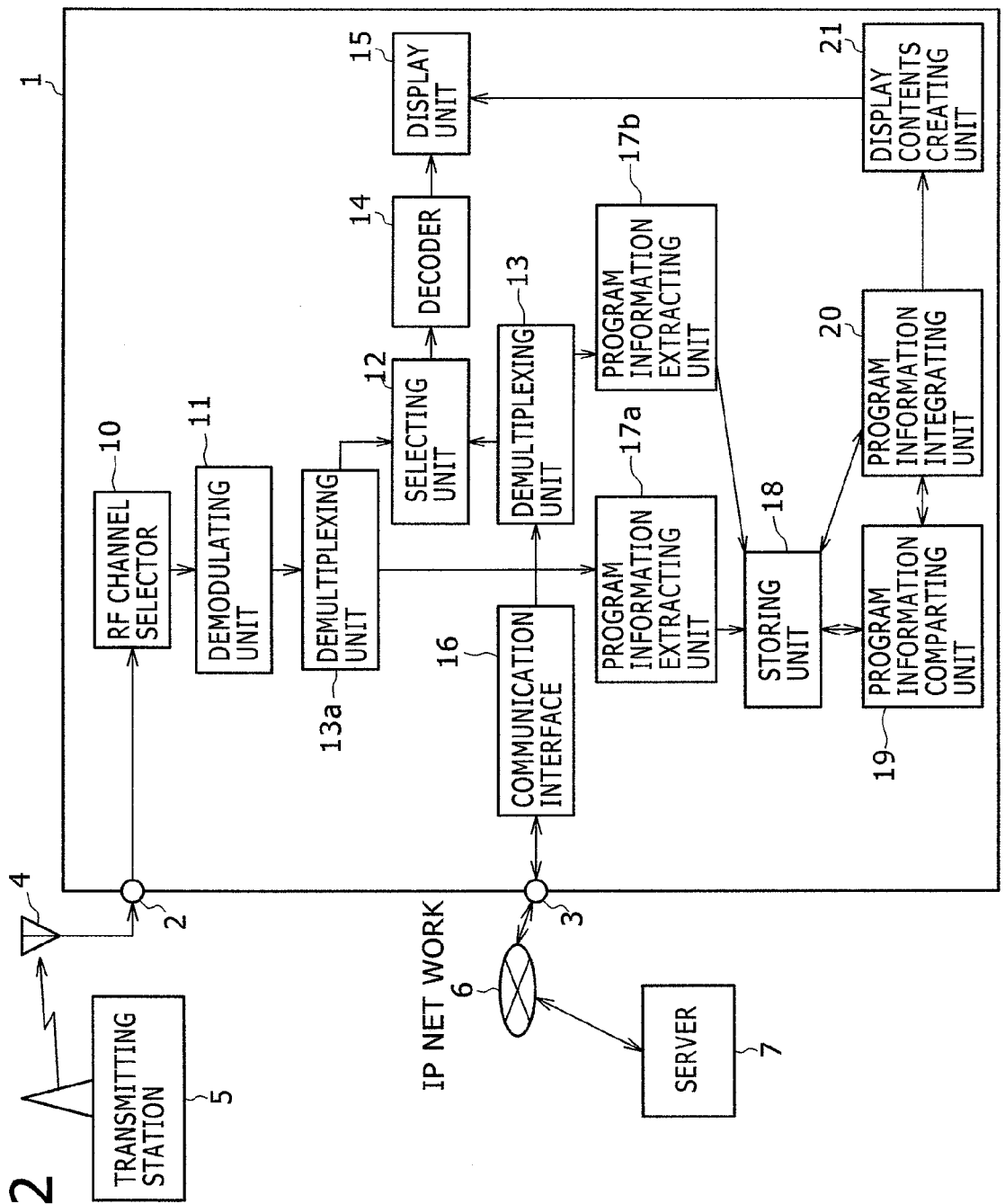
FIG. 2 is a block diagram showing another embodiment of a receiving apparatus of the present invention.

FIG. 2 is a block diagram showing another embodiment of the receiving apparatus of the present invention. In FIG. 2, for signal input from two transmission media, dedicated demultiplexing units 13a, 13b and program information extracting units 17a, 17b are respectively provided.

First, a description will be made of the case of direct reception of an RF signal of terrestrial digital broadcasting as transmission media. Like the receiving apparatus shown in FIG. 1, an RF signal inputted to the RF input terminal 2 is outputted to the demodulating unit 11 after a desired channel is selected in the RF channel selector 10. The demodulating unit 11 demodulates the inputted modulated signal, and outputs a multiplexed stream to a demultiplexing unit 13a. The demodulating unit 13a separates encoded video and voice signals and added data containing program information by type, and outputs the encoded video and voice signals to the selecting unit 12, and the added data to a program information extracting unit 17a. The video and voice signals selected in the selecting unit 12 are decoded by the video/voice decoder 14, and reproduced as video and voice in the display unit 15. The program information extracting unit 17a extracts program information from the added data, and stores it in the storing unit 18.

Next, a description will be made of the case of reception by use of an IP network as transmission media. When a signal from the server 7 is received, a multiplexed stream of a channel to which a transmission request is issued is fetched in the communication interface 16, and outputted to a demultiplexing unit 13b. The demodulating unit 13b separates encoded video and voice signals and added data containing program information by type, and outputs the encoded video and voice signals to the selecting unit 12, and the added data to a program information extracting unit 17b. The video and voice signals selected in the selecting unit 12 are decoded by the video/voice decoder 14, and reproduced as video and voice in the display unit 15. The program information extracting unit 17b extracts program information from the added data, and stores it in the storing unit 18.

The operation of integrating program information to display an EPG is the same as that in the embodiment in FIG. 1. Specifically, the program information integrating unit 20 adds program information of both the RF direct reception and the IP retransmission to create program information as single transmission media. When the program information comparing unit 19 determines that a same channel exists, the program information integrating unit 20 deletes either piece of program information of the same channel. If program information without duplicate information of same channels has been created as a result of comparing all program information of the RF direct reception and the IP retransmission, the program information is stored in the storing unit 18 as new program information. Therefore, only one piece of program information of a same channel is stored in the storing unit 18. The display contents creating unit 21 creates display contents based on the new program information stored in the storing unit 18, and displays an EPG in the display unit. As a result, an EPG can be displayed in the display unit 15 without duplication of same channels.

By displaying an EPG as a result of integrating same channels to avoid duplication, without duplication and loss of channels, an easy-to-use EPG screen can be provided to the users.

Furthermore, in the receiving apparatus of this embodiment, for RF direct reception and IP retransmission, the demultiplexing unit and the program extracting unit are provided in the different systems. Therefore, program information can be extracted independently and in parallel. As a result, time for acquiring program information of all receivable channels can be reduced.

In the above-described embodiments, the cases of input from the two systems of the RF direct reception and the IP retransmission as transmission media have been described as examples. The kinds of input signal sources and the number of systems are not limited to the above; the construction of the receiving apparatus may be tailored accordingly. For example, the connection of RF output signals of a satellite broadcasting antenna and RF distribution signals of cable television to the RF input terminal 2 would enable the same operation. Moreover, the receiving apparatus may be constructed to receive other RF signals in the IP communication interface. Specifically, the communication terminal 3 is replaced by a second RF input terminal, and the communication interface 16 is replaced by a second RF channel selector and a second demodulating unit. By inputting ground waves to the RF input terminal 2 and cable television signals to the second RF input terminal, the different transmission medial of ground waves and cable television can be received, and EPGs of the both can be integrally displayed.

What is claimed is:

1. A receiving apparatus that can receive digital broadcasting from a first and a second transmission media, comprising:
   a program information extracting unit that extracts program information for channels receivable from the first and the second transmission media;
   a storing unit that stores program information of individual channels extracted in the program information extracting unit;
   a program information integrating unit that integrates program information of the first transmission medium and program information of the second transmission medium; and
   a display contents creating unit that creates a program guide based on program information integrated in the program information integrating unit, and the program guide contains a program information portion and a header portion to be simultaneously displayed in a display unit;
   wherein the program information integrating unit compares the program information stored in the storing unit, and integrates duplicate program information of a same channel, if any, into one piece of program information; and
   the program information portion of the program guide created by the display contents creating unit displays the program information in a manner so as not to reveal whether the program information has been received from the first transmission medium or the second transmission medium, and the header portion of the program guide displays only a name of the first transmission medium.

2. The receiving apparatus of claim 1,
   wherein the program information integrating unit, when program information of a same channel is duplicately stored in the storing unit, can set which of the first and the second transmission media to receive preferentially, and the program information portion of the program guide created by the display contents creating unit displays the channel received from the preferential transmission medium set in the program information integrating unit, and the header portion of the program guide displays only the name of the first transmission media.

3. The receiving apparatus of claim 1,
   wherein the first transmission medium is terrestrial digital broadcasting, and the second transmission medium is IP retransmission.

* * * * *